June 20, 1933.  R. R. McCARTY  1,914,782
LAWN MOWER HANDLE ATTACHMENT
Filed Sept. 27, 1932   2 Sheets-Sheet 1
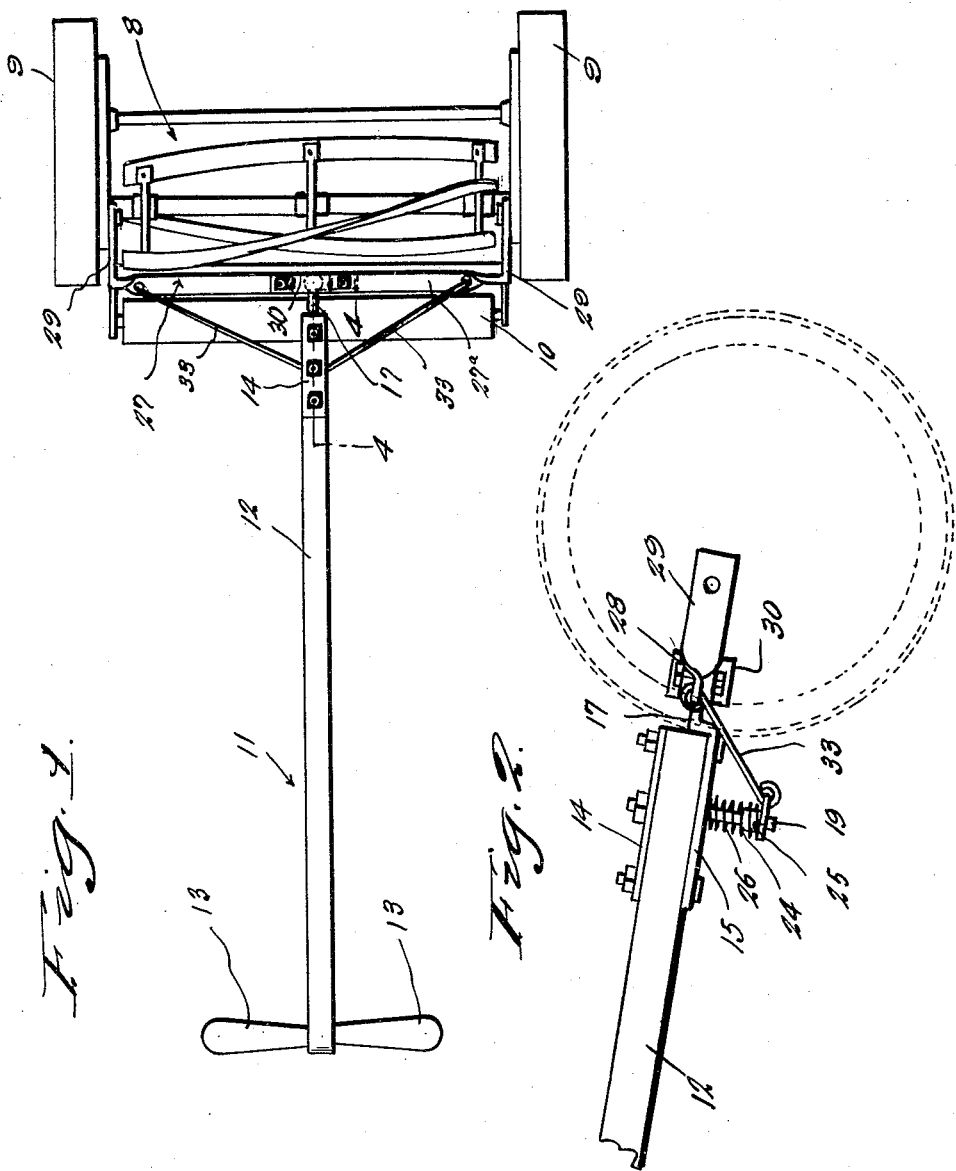
Inventor
Reason R. McCarty
By Clarence A. O'Brien
Attorney

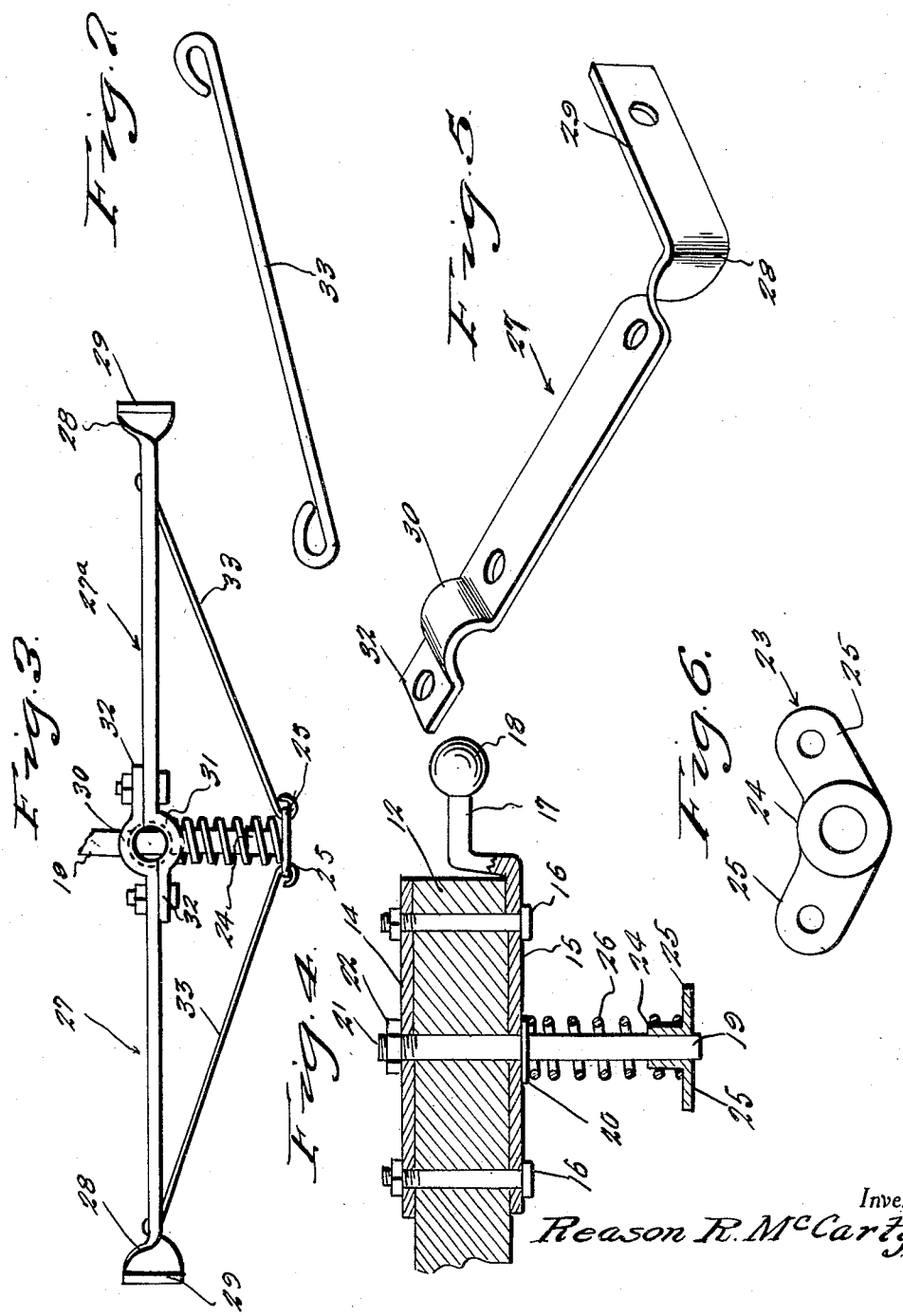

Patented June 20, 1933

1,914,782

UNITED STATES PATENT OFFICE

REASON R. McCARTY, OF WEST UNION, OHIO

LAWN MOWER HANDLE ATTACHMENT

Application filed September 27, 1932. Serial No. 635,084.

This invention relates to an improved lawn mower of the domestic or walking attendant type, wherein the point of structural distinction is predicated upon the handle and attaching means therefor.

It is a matter of common knowledge that ordinary or conventional lawn mowers are equipped with rigidly attached handles and that it is frequently observed that the rotary cutter carriage cannot be expeditiously maneuvered in places difficult of access particularly within the vicinity of trees, shrubbery, and the like.

The purpose of the present invention is to provide a lawn mower wherein the handle is attached through the medium of a ball and socket joint, whereby to provide the desired flexible action permitting the handgrips of the handle or shaft to be properly angled as conditions demand and thereby affording successful and easy steering of the machine in order to permit it to be satisfactorily operated in close corners without necessitating bodily lifting and adjustment of the carriage.

The explicit structural details selected for accomplishing these improved results will become more readily apparent from the following description and drawings.

In the drawings:

Figure 1 is a top plan view of a lawn mower revised in accordance with the improvements of this invention.

Figure 2 is an edge elevation of the handle and special attaching yoke therefor.

Figure 3 is a detail elevational view of said special yoke and stress distributing and bracing means.

Figure 4 is an enlarged detail section on the line 4—4 of Figure 1.

Figures 5, 6 and 7 are detail views.

As shown in Figure 1, the wheel equipped carriage is of conventional form and includes a regulation frame structure for supporting the rotary bladed cutter 8 and the wheels 9. The numeral 10 merely designates the roller.

The handle 11 comprises a regulation type shaft 12 and appropriate hand grips 13. In accordance with the principles of the present invention, the inner end portion of the shaft is provided, as detailed in Figure 4, with a pair of complemental wear plates 14 and 15 secured in place by bolts 16. The plate 15 is formed with an L-shaped extension 17 terminating in a ball joint head 18. The numeral 19 designates a stabilizing pin having its intermediate portion provided with an abutment flange 20 and its upper end screw-threaded as at 21 to accommodate a clamping nut 22. This end portion of the pin extends through alined holes in the shaft and plates 14 and 15. Fitted on the lower depending end portion of the pin is an appropriate coupling fixture 23 comprising a collar 24 surrounding and slidable and rotatable on the pin, together with a pair of outstanding apertured forwardly diverging ears 25.

The numeral 26 designates a coil spring surrounding the pin and collar to serve as a yieldable shock absorber, whereby to provide the requisite flexible properties.

The yoke for attaching the shaft of the handle to the frame or carriage is of special design and composed of a pair of duplicate companion units or sections 27 and 27a having their outer end portions twisted as indicated at 28 and then directed laterally as at 29 and bolted or otherwise fastened to the frame as shown in Figure 1. The meeting or connecting ends of said units are provided with complemental bends 30 and 31 brought together and secured by bolts 32 to provide a retaining socket for the ball jointing element or head 18.

The numerals 33 designates stay rods or links having their lower or inner ends secured to the apertured ears 25 and their outer ends fastened to the outer end portions of the respective units 27 and 27a. These stay rods occupy the converging or depending angular relationship depicted in Figures 1 and 2, whereby to support the shaft 12 in its normal operative plane while at the same time allowing it to be raised and lowered vertically and and twisted axially with respect to the yoke in order to permit it to assume the most satisfactory position with respect to the wheeled carriage in order to permit said carriage to be maneuvered due to the proper steering facilities thus provided.

The gist of the invention is found in the provision of a two-part yoke wherein the parts or units are rigidly attached to the frame of the lawn mower and wherein the corresponding inner adjacent ends thereof are fashioned to provide a socket; together with the especially constructed inner end of the shaft of the handle terminating in a ball jointing head mounted in said socket to afford the requisite loose connection for effective and easy steering.

In order, however, to render the structure properly balanced and to afford proper maintenance means for holding the handle in a normal centralized position, I provide the converging downwardly inclined stay rods 33 attached by the special coupling fixture 23 to the stabilizing pin 19, associating with said pin the cushioning spring 32. These latter details co-operate to supply the requisite flexible properties while at the same time preventing undue lost motion and wabbling of the handle.

Broadly, the principal novelty is predicated on the provision of a handle and wheeled carriage with the handle attached thereto in a manner to permit it to be twisted for easy steering, together with suitable means for sustaining the handle in an appropriate plane for satisfactory pushing and pulling of the machine.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. A handle attachment for a lawn mower of the class described comprising a yoke adapted to be fastened to the frame of the mower, a shaft provided at its outer end with customary handgrips, a ball joint connector on the inner end of said shaft, the central portion of said yoke having a socket receiving and enclosing said ball joint connector, a stabilizing pin carried by the inner end portion of said shaft, and flexible linkage means connecting the pin with the yoke.

2. A handle attachment of the class described comprising a yoke adapted to be fastened to a wheel supported frame, the central portion of said yoke being provided with a socket, a handle comprising a shaft provided with handgrips at one end, a pair of wear plates secured to the opposite end, one of said wear plates being formed with a laterally offset L-shaped extension terminating in a ball joint connector, said ball joint connector being mounted in said socket, and yieldable stabilizing means affording an additional connection between the shaft and end portions of the yoke.

3. A structure of the class described comprising an attaching yoke, a handle provided with a shaft pivotally connected to the central portion of said yoke, a pair of downwardly inclined rearwardly converging stay rods connected at their outer ends to the end portions of said yoke, a stabilizing pin secured to the inner ends of said shaft, a collar embracing said pin and provided with apertured ears, the inner adjacent ends of said rods being connected to said ears.

4. A structure of the class described comprising an attaching yoke, a handle provided with a shaft pivotally connected to the central portion of said yoke, a pair of downwardly inclined rearwardly converging stay rods connected at their outer ends to the end portions of said yoke, a stabilizing pin secured to the inner end of said shaft, a collar embracing said pin and provided with apertured ears, the inner adjacent ends of said rods being connected to said ears, and a coil spring surrounding said pin and collar and bearing at its lower end against the ears and at its upper end against the underside of the shaft.

5. A lawn mower handle attachment, comprising a yoke, a longitudinal shaft provided at its outer end with conventional handgrips, a plate secured to the underside of the extreme inner end of said shaft and provided with an L-shaped extension terminating in a ball jointing head, the central portion of said yoke having a socket with which said head is pivotally connected, a vertically disposed stabilizing pin attached to the inner end portion of said shaft, and a pair of duplicate stabilizing links attached at their outer ends to the corresponding portions of the yoke and having flexible connection at their inner ends with said pin.

6. A lawn mower handle attachment comprising a yoke, the central portion of said yoke being provided with a socket, a shaft provided at its outer end with customary handgrips, the inner end of the shaft being provided with an extension terminating in a ball joint connecting head pivotally connected with the socket, a stabilizing pin secured to the inner end portion of said shaft, a collar slidably and rotatably surrounding the lower end of said pin and provided with a pair of outstanding diverging ears, a pair of complemental stabilizing links fastened at their outer ends to the corresponding portions of the yoke and having their inner ends inclined downwardly into converging relationship and attached to said ears, and a cushioning coiled spring surrounding the pin and collar, bearing at its lower end against the ears and at its upper end against the aforesaid socket.

In testimony whereof I affix my signature.

REASON R. McCARTY.